(12) United States Patent
Kaller et al.

(10) Patent No.: US 9,369,557 B2
(45) Date of Patent: Jun. 14, 2016

(54) FREQUENCY-DEPENDENT SIDETONE CALIBRATION

(71) Applicant: Cirrus Logic, Inc., Austin, TX (US)

(72) Inventors: Roy Scott Kaller, Phoenix, AZ (US); Jon D. Hendrix, Wimberly, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 69 days.

(21) Appl. No.: 14/197,814

(22) Filed: Mar. 5, 2014

(65) Prior Publication Data

US 2015/0256660 A1 Sep. 10, 2015

(51) Int. Cl.
| | | |
|---|---|---|
| H04M 1/00 | (2006.01) | |
| H04M 1/58 | (2006.01) | |
| H04M 9/08 | (2006.01) | |
| G10L 21/0364 | (2013.01) | |
| G10L 21/0208 | (2013.01) | |

(52) U.S. Cl.
CPC ............. *H04M 1/58* (2013.01); *G10L 21/0364* (2013.01); *H04M 1/585* (2013.01); *H04M 9/08* (2013.01); *G10L 2021/02082* (2013.01)

(58) Field of Classification Search
CPC ..................................................... H04M 1/58
See application file for complete search history.

(56) References Cited

U.S. PATENT DOCUMENTS

| | | |
|---|---|---|
| 4,020,567 A | 5/1977 | Webster |
| 4,926,464 A | 5/1990 | Schley-May |
| 4,998,241 A | 3/1991 | Brox et al. |
| 5,018,202 A | 5/1991 | Takahashi |
| 5,021,753 A | 6/1991 | Chapman |
| 5,044,373 A | 9/1991 | Northeved et al. |
| 5,117,401 A | 5/1992 | Feintuch |
| 5,251,263 A | 10/1993 | Andrea et al. |
| 5,278,913 A | 1/1994 | Delfosse et al. |
| 5,321,759 A | 6/1994 | Yuan |
| 5,337,365 A | 8/1994 | Hamabe et al. |
| 5,359,662 A | 10/1994 | Yuan et al. |

(Continued)

FOREIGN PATENT DOCUMENTS

| | | |
|---|---|---|
| DE | 102011013343 A1 | 9/2012 |
| EP | 0412902 A2 | 2/1991 |

(Continued)

OTHER PUBLICATIONS

U.S. Appl. No. 13/686,353, filed Nov. 27, 2012, Hendrix, et al.

(Continued)

*Primary Examiner* — Joseph T Phan
(74) *Attorney, Agent, or Firm* — Mitch Harris, Atty at Law, LLC; Andrew M. Harris

(57) ABSTRACT

A personal audio device includes a sidetone circuit with one or more adjustable coefficients that generates a sidetone signal from the output of a first microphone. The sidetone circuit has one or more adjustable coefficients for altering the relationship between the first microphone signal and the sidetone signal. The personal audio device also includes a transducer for reproducing playback audio and the sidetone signal at an ear of a listener and a second microphone for measuring the output of the transducer as delivered to the ear of the listener. The sidetone circuit includes a calibration circuit for estimating a response of the second microphone to the sidetone signal and adjusting the coefficient of the sidetone circuit according to the estimated response.

25 Claims, 7 Drawing Sheets

(56) References Cited

U.S. PATENT DOCUMENTS

| | | |
|---|---|---|
| 5,377,276 A | 12/1994 | Terai et al. |
| 5,386,477 A | 1/1995 | Popovich et al. |
| 5,410,605 A | 4/1995 | Sawada et al. |
| 5,425,105 A | 6/1995 | Lo et al. |
| 5,445,517 A | 8/1995 | Kondou et al. |
| 5,465,413 A | 11/1995 | Enge et al. |
| 5,481,615 A | 1/1996 | Eatwell et al. |
| 5,548,681 A | 8/1996 | Gleaves et al. |
| 5,550,925 A | 8/1996 | Hori et al. |
| 5,559,893 A | 9/1996 | Krokstad et al. |
| 5,586,190 A | 12/1996 | Trantow et al. |
| 5,640,450 A | 6/1997 | Watanabe |
| 5,668,747 A | 9/1997 | Ohashi |
| 5,687,075 A | 11/1997 | Stothers |
| 5,696,831 A | 12/1997 | Inanaga et al. |
| 5,699,437 A | 12/1997 | Finn |
| 5,706,344 A | 1/1998 | Finn |
| 5,740,256 A | 4/1998 | Castello Da Costa et al. |
| 5,768,124 A | 6/1998 | Stothers et al. |
| 5,815,582 A | 9/1998 | Claybaugh et al. |
| 5,832,095 A | 11/1998 | Daniels |
| 5,852,667 A | 12/1998 | Pan et al. |
| 5,909,498 A | 6/1999 | Smith |
| 5,940,519 A | 8/1999 | Kuo |
| 5,946,391 A | 8/1999 | Dragwidge et al. |
| 5,991,418 A | 11/1999 | Kuo |
| 6,041,126 A | 3/2000 | Terai et al. |
| 6,118,878 A | 9/2000 | Jones |
| 6,181,801 B1 | 1/2001 | Puthuff et al. |
| 6,219,427 B1 | 4/2001 | Kates et al. |
| 6,278,786 B1 | 8/2001 | McIntosh |
| 6,282,176 B1 | 8/2001 | Hemkumar |
| 6,304,179 B1 | 10/2001 | Lolito et al. |
| 6,317,501 B1 | 11/2001 | Matsuo |
| 6,418,228 B1 | 7/2002 | Terai et al. |
| 6,434,246 B1 | 8/2002 | Kates et al. |
| 6,434,247 B1 | 8/2002 | Kates et al. |
| 6,445,799 B1 | 9/2002 | Taenzer et al. |
| 6,522,746 B1 | 2/2003 | Marchok et al. |
| 6,542,436 B1 | 4/2003 | Myllyla |
| 6,650,701 B1 | 11/2003 | Hsiang et al. |
| 6,683,960 B1 | 1/2004 | Fujii et al. |
| 6,738,482 B1 | 5/2004 | Jaber |
| 6,766,292 B1 | 7/2004 | Chandran |
| 6,768,795 B2 | 7/2004 | Feltstrom et al. |
| 6,792,107 B2 | 9/2004 | Tucker et al. |
| 6,850,617 B1 | 2/2005 | Weigand |
| 6,940,982 B1 | 9/2005 | Watkins |
| 7,016,504 B1 | 3/2006 | Shennib |
| 7,058,463 B1 | 6/2006 | Ruha et al. |
| 7,103,188 B1 | 9/2006 | Jones |
| 7,181,030 B2 | 2/2007 | Rasmussen et al. |
| 7,330,739 B2 | 2/2008 | Somayajula |
| 7,365,669 B1 | 4/2008 | Melanson |
| 7,450,726 B2 | 11/2008 | Goyal |
| 7,466,838 B1 | 12/2008 | Moseley |
| 7,564,966 B2 | 7/2009 | Sano |
| 7,620,432 B2 | 11/2009 | Willins et al. |
| 7,680,456 B2 | 3/2010 | Muhammad et al. |
| 7,742,746 B2 | 6/2010 | Xiang et al. |
| 7,742,790 B2 | 6/2010 | Konchitsky et al. |
| 7,817,808 B2 | 10/2010 | Konchitsky et al. |
| 7,836,216 B2 | 11/2010 | Kashi et al. |
| 7,912,501 B2 | 3/2011 | Johnson et al. |
| 7,953,231 B2 | 5/2011 | Ishida |
| 8,019,050 B2 | 9/2011 | Mactavish et al. |
| 8,085,966 B2 | 12/2011 | Amsel |
| D666,169 S | 8/2012 | Tucker et al. |
| 8,249,262 B2 | 8/2012 | Chua et al. |
| 8,251,903 B2 | 8/2012 | LeBoeuf et al. |
| 8,290,537 B2 | 10/2012 | Lee et al. |
| 8,325,934 B2 | 12/2012 | Kuo |
| 8,331,604 B2 | 12/2012 | Saito et al. |
| 8,374,358 B2 | 2/2013 | Buck et al. |
| 8,379,884 B2 | 2/2013 | Horibe et al. |
| 8,401,200 B2 | 3/2013 | Tiscareno et al. |
| 8,442,251 B2 | 5/2013 | Jensen et al. |
| 8,559,661 B2 | 10/2013 | Tanghe |
| 8,600,085 B2 | 12/2013 | Chen et al. |
| 8,629,580 B2 | 1/2014 | Johnson et al. |
| 8,655,007 B2 | 2/2014 | Hansson et al. |
| 8,718,296 B2 | 5/2014 | Chang |
| 8,775,172 B2 | 7/2014 | Konchitsky et al. |
| 8,804,974 B1 | 8/2014 | Melanson |
| 8,831,239 B2 | 9/2014 | Bakalos |
| 8,842,848 B2 | 9/2014 | Donaldson et al. |
| 8,855,330 B2 | 10/2014 | Taenzer |
| 8,861,743 B2 | 10/2014 | Pantfoerder et al. |
| 8,908,877 B2 | 12/2014 | Abdollahzadeh Milani et al. |
| 8,942,976 B2 | 1/2015 | Li et al. |
| 8,977,545 B2 | 3/2015 | Zeng et al. |
| 9,066,176 B2 | 6/2015 | Hendrix et al. |
| 9,071,724 B2 | 6/2015 | Do et al. |
| 9,082,391 B2 | 7/2015 | Yermeche et al. |
| 9,129,586 B2 | 9/2015 | Bajic et al. |
| 2001/0053228 A1 | 12/2001 | Jones |
| 2002/0003887 A1 | 1/2002 | Zhang et al. |
| 2003/0063759 A1 | 4/2003 | Brennan et al. |
| 2003/0072439 A1 | 4/2003 | Gupta |
| 2003/0185403 A1 | 10/2003 | Sibbald |
| 2004/0047464 A1 | 3/2004 | Yu et al. |
| 2004/0120535 A1 | 6/2004 | Woods |
| 2004/0165736 A1 | 8/2004 | Hetherington et al. |
| 2004/0167777 A1 | 8/2004 | Hetherington et al. |
| 2004/0202333 A1 | 10/2004 | Csermak et al. |
| 2004/0240677 A1 | 12/2004 | Onishi et al. |
| 2004/0242160 A1 | 12/2004 | Ichikawa et al. |
| 2004/0264706 A1 | 12/2004 | Ray et al. |
| 2005/0004796 A1 | 1/2005 | Trump et al. |
| 2005/0018862 A1 | 1/2005 | Fisher |
| 2005/0117754 A1 | 6/2005 | Sakawaki |
| 2005/0207585 A1 | 9/2005 | Christoph |
| 2005/0240401 A1 | 10/2005 | Ebenezer |
| 2006/0018460 A1 | 1/2006 | McCree |
| 2006/0035593 A1 | 2/2006 | Leeds |
| 2006/0055910 A1 | 3/2006 | Lee |
| 2006/0069556 A1 | 3/2006 | Nadjar et al. |
| 2006/0153400 A1 | 7/2006 | Fujita et al. |
| 2006/0159282 A1 | 7/2006 | Borsch |
| 2006/0161428 A1 | 7/2006 | Fouret |
| 2006/0251266 A1 | 11/2006 | Saunders et al. |
| 2007/0030989 A1 | 2/2007 | Kates |
| 2007/0033029 A1 | 2/2007 | Sakawaki |
| 2007/0038441 A1 | 2/2007 | Inoue et al. |
| 2007/0047742 A1 | 3/2007 | Taenzer et al. |
| 2007/0053524 A1 | 3/2007 | Haulick et al. |
| 2007/0076896 A1 | 4/2007 | Hosaka et al. |
| 2007/0154031 A1 | 7/2007 | Avendano et al. |
| 2007/0258597 A1 | 11/2007 | Rasmussen et al. |
| 2007/0297620 A1 | 12/2007 | Choy |
| 2008/0019548 A1 | 1/2008 | Avendano |
| 2008/0101589 A1 | 5/2008 | Horowitz et al. |
| 2008/0107281 A1 | 5/2008 | Togami et al. |
| 2008/0144853 A1 | 6/2008 | Sommerfeldt et al. |
| 2008/0177532 A1 | 7/2008 | Greiss et al. |
| 2008/0181422 A1 | 7/2008 | Christoph |
| 2008/0226098 A1 | 9/2008 | Haulick et al. |
| 2008/0240413 A1 | 10/2008 | Mohammad et al. |
| 2008/0240455 A1 | 10/2008 | Inoue et al. |
| 2008/0240457 A1 | 10/2008 | Inoue et al. |
| 2008/0269926 A1 | 10/2008 | Xiang et al. |
| 2009/0012783 A1 | 1/2009 | Klein |
| 2009/0034748 A1 | 2/2009 | Sibbald |
| 2009/0041260 A1 | 2/2009 | Jorgensen et al. |
| 2009/0046867 A1 | 2/2009 | Clemow |
| 2009/0060222 A1 | 3/2009 | Jeong et al. |
| 2009/0080676 A1 | 3/2009 | Solbeck et al. |
| 2009/0086990 A1 | 4/2009 | Christoph |
| 2009/0175461 A1 | 7/2009 | Nakamura et al. |
| 2009/0175466 A1 | 7/2009 | Elko et al. |
| 2009/0196429 A1 | 8/2009 | Ramakrishnan et al. |
| 2009/0220107 A1 | 9/2009 | Every et al. |
| 2009/0238369 A1 | 9/2009 | Ramakrishnan et al. |
| 2009/0245529 A1 | 10/2009 | Asada et al. |

(56) References Cited

U.S. PATENT DOCUMENTS

| | | |
|---|---|---|
| 2009/0254340 A1 | 10/2009 | Sun et al. |
| 2009/0290718 A1 | 11/2009 | Kahn et al. |
| 2009/0296965 A1 | 12/2009 | Kojima |
| 2009/0304200 A1 | 12/2009 | Kim et al. |
| 2009/0311979 A1 | 12/2009 | Husted et al. |
| 2010/0002891 A1 | 1/2010 | Shiraishi et al. |
| 2010/0014683 A1 | 1/2010 | Maeda et al. |
| 2010/0014685 A1 | 1/2010 | Wurm |
| 2010/0061564 A1 | 3/2010 | Clemow et al. |
| 2010/0069114 A1 | 3/2010 | Lee et al. |
| 2010/0082339 A1 | 4/2010 | Konchitsky et al. |
| 2010/0098263 A1 | 4/2010 | Pan et al. |
| 2010/0098265 A1 | 4/2010 | Pan et al. |
| 2010/0124335 A1 | 5/2010 | Wessling et al. |
| 2010/0124336 A1 | 5/2010 | Shridhar et al. |
| 2010/0124337 A1 | 5/2010 | Wertz et al. |
| 2010/0131269 A1 | 5/2010 | Park et al. |
| 2010/0142715 A1 | 6/2010 | Goldstein et al. |
| 2010/0150367 A1 | 6/2010 | Mizuno |
| 2010/0158330 A1 | 6/2010 | Guissin et al. |
| 2010/0166203 A1 | 7/2010 | Peissig et al. |
| 2010/0195838 A1 | 8/2010 | Bright |
| 2010/0195844 A1 | 8/2010 | Christoph et al. |
| 2010/0207317 A1 | 8/2010 | Iwami et al. |
| 2010/0239126 A1 | 9/2010 | Grafenberg et al. |
| 2010/0246855 A1 | 9/2010 | Chen |
| 2010/0260345 A1 | 10/2010 | Shridhar et al. |
| 2010/0266137 A1 | 10/2010 | Sibbald et al. |
| 2010/0272276 A1 | 10/2010 | Carreras et al. |
| 2010/0272283 A1 | 10/2010 | Carreras et al. |
| 2010/0274564 A1 | 10/2010 | Bakalos et al. |
| 2010/0284546 A1 | 11/2010 | DeBrunner et al. |
| 2010/0291891 A1 | 11/2010 | Ridgers et al. |
| 2010/0296666 A1 | 11/2010 | Lin |
| 2010/0296668 A1 | 11/2010 | Lee et al. |
| 2010/0310086 A1 | 12/2010 | Magrath et al. |
| 2010/0322430 A1 | 12/2010 | Isberg |
| 2011/0007907 A1 | 1/2011 | Park et al. |
| 2011/0026724 A1 | 2/2011 | Doclo |
| 2011/0099010 A1 | 4/2011 | Zhang |
| 2011/0106533 A1 | 5/2011 | Yu |
| 2011/0116654 A1 | 5/2011 | Chan et al. |
| 2011/0129098 A1 | 6/2011 | Delano et al. |
| 2011/0130176 A1 | 6/2011 | Magrath et al. |
| 2011/0142247 A1 | 6/2011 | Fellers et al. |
| 2011/0144984 A1 | 6/2011 | Konchitsky |
| 2011/0158419 A1 | 6/2011 | Theverapperuma et al. |
| 2011/0206214 A1 | 8/2011 | Christoph et al. |
| 2011/0222698 A1 | 9/2011 | Asao et al. |
| 2011/0249826 A1 | 10/2011 | Van Leest |
| 2011/0288860 A1 | 11/2011 | Schevciw et al. |
| 2011/0293103 A1 | 12/2011 | Park et al. |
| 2011/0299695 A1 | 12/2011 | Nicholson |
| 2011/0305347 A1 | 12/2011 | Wurm |
| 2011/0317848 A1 | 12/2011 | Ivanov et al. |
| 2012/0135787 A1 | 5/2012 | Kusunoki et al. |
| 2012/0140917 A1 | 6/2012 | Nicholson et al. |
| 2012/0140942 A1 | 6/2012 | Loeda |
| 2012/0140943 A1 | 6/2012 | Hendrix et al. |
| 2012/0148062 A1 | 6/2012 | Scarlett et al. |
| 2012/0155666 A1 | 6/2012 | Nair |
| 2012/0170766 A1 | 7/2012 | Alves et al. |
| 2012/0207317 A1 | 8/2012 | Abdollahzadeh Milani et al. |
| 2012/0215519 A1 | 8/2012 | Park et al. |
| 2012/0237051 A1 | 9/2012 | Lee |
| 2012/0250873 A1 | 10/2012 | Bakalos et al. |
| 2012/0259626 A1 | 10/2012 | Li et al. |
| 2012/0263313 A1 | 10/2012 | Yu et al. |
| 2012/0263317 A1 | 10/2012 | Shin et al. |
| 2012/0281850 A1 | 11/2012 | Hyatt |
| 2012/0300955 A1 | 11/2012 | Iseki et al. |
| 2012/0300958 A1 | 11/2012 | Klemmensen |
| 2012/0300960 A1 | 11/2012 | Mackay et al. |
| 2012/0308021 A1 | 12/2012 | Kwatra et al. |
| 2012/0308025 A1 | 12/2012 | Hendrix et al. |
| 2012/0308026 A1 | 12/2012 | Kamath et al. |
| 2012/0308027 A1 | 12/2012 | Kwatra |
| 2012/0308028 A1 | 12/2012 | Kwatra et al. |
| 2012/0310640 A1 | 12/2012 | Kwatra et al. |
| 2013/0010982 A1 | 1/2013 | Elko et al. |
| 2013/0083939 A1 | 4/2013 | Fellers et al. |
| 2013/0142350 A1 | 6/2013 | Larsen et al. |
| 2013/0158919 A1 | 6/2013 | Shah et al. |
| 2013/0195282 A1 | 8/2013 | Ohita et al. |
| 2013/0243198 A1 | 9/2013 | Van Rumpt |
| 2013/0243225 A1 | 9/2013 | Yokota |
| 2013/0272539 A1 | 10/2013 | Kim et al. |
| 2013/0287218 A1 | 10/2013 | Alderson et al. |
| 2013/0287219 A1 | 10/2013 | Hendrix et al. |
| 2013/0301842 A1 | 11/2013 | Hendrix et al. |
| 2013/0301846 A1 | 11/2013 | Alderson et al. |
| 2013/0301847 A1 | 11/2013 | Alderson et al. |
| 2013/0301848 A1 | 11/2013 | Zhou et al. |
| 2013/0301849 A1 | 11/2013 | Alderson et al. |
| 2013/0315403 A1 | 11/2013 | Samuelsson |
| 2013/0343556 A1 | 12/2013 | Bright |
| 2013/0343571 A1 | 12/2013 | Rayala et al. |
| 2014/0016803 A1 | 1/2014 | Puskarich |
| 2014/0036137 A1 | 2/2014 | Pong et al. |
| 2014/0044275 A1 | 2/2014 | Goldstein et al. |
| 2014/0050332 A1 | 2/2014 | Nielsen et al. |
| 2014/0072134 A1 | 3/2014 | Po et al. |
| 2014/0086425 A1 | 3/2014 | Jensen et al. |
| 2014/0146976 A1 | 5/2014 | Rundle |
| 2014/0169579 A1 | 6/2014 | Azmi |
| 2014/0177851 A1 | 6/2014 | Kitazawa et al. |
| 2014/0211953 A1 | 7/2014 | Alderson et al. |
| 2014/0270222 A1 | 9/2014 | Hendrix et al. |
| 2014/0270223 A1 | 9/2014 | Li et al. |
| 2014/0270224 A1 | 9/2014 | Zhou et al. |
| 2014/0294182 A1 | 10/2014 | Axelsson et al. |
| 2014/0307887 A1 | 10/2014 | Alderson |
| 2014/0307888 A1 | 10/2014 | Alderson et al. |
| 2014/0307890 A1 | 10/2014 | Zhou et al. |
| 2014/0314244 A1 | 10/2014 | Yong |
| 2014/0314247 A1 | 10/2014 | Zhang |
| 2014/0369517 A1 | 12/2014 | Zhou et al. |
| 2015/0092953 A1 | 4/2015 | Abdollahzadeh Milani et al. |
| 2015/0161981 A1 | 6/2015 | Kwatra |

FOREIGN PATENT DOCUMENTS

| | | |
|---|---|---|
| EP | 1691577 A2 | 8/2006 |
| EP | 1880699 A2 | 1/2008 |
| EP | 1947642 A1 | 7/2008 |
| EP | 2133866 A1 | 12/2009 |
| EP | 2216774 A1 | 8/2010 |
| EP | 2237573 A1 | 10/2010 |
| EP | 2395500 A1 | 12/2011 |
| EP | 2395501 A1 | 12/2011 |
| EP | 2551845 A1 | 1/2013 |
| GB | 2401744 A | 11/2004 |
| GB | 2436657 A | 10/2007 |
| GB | 2455821 A | 6/2009 |
| GB | 2455824 A | 6/2009 |
| GB | 2455828 A | 6/2009 |
| GB | 2484722 A | 4/2012 |
| JP | H06-186985 A | 7/1994 |
| JP | 07104769 | 4/1995 |
| JP | 07240989 | 9/1995 |
| JP | 07325588 | 12/1995 |
| JP | H11305783 A | 11/1999 |
| JP | 2008015046 A | 1/2008 |
| WO | WO 9113429 | 9/1991 |
| WO | WO 9911045 | 3/1999 |
| WO | WO 03/015074 A1 | 2/2003 |
| WO | WO 03015275 A1 | 2/2003 |
| WO | WO 2004009007 A1 | 1/2004 |
| WO | WO 2004017303 A1 | 2/2004 |
| WO | WO 2006128768 A1 | 12/2006 |
| WO | WO 2007007916 A1 | 1/2007 |
| WO | WO 2007011337 | 1/2007 |
| WO | WO 2007110807 A2 | 10/2007 |
| WO | WO 2007113487 A1 | 11/2007 |

(56) References Cited

FOREIGN PATENT DOCUMENTS

| WO | WO 2010117714 A1 | 10/2010 |
|---|---|---|
| WO | WO 2010131154 A1 | 11/2010 |
| WO | WO 2012134874 A1 | 10/2012 |
| WO | WO 2015038255 A1 | 3/2015 |

OTHER PUBLICATIONS

U.S. Appl. No. 13/795,160, filed Mar. 12, 2013, Hendrix, et al.
U.S. Appl. No. 13/692,367, filed Dec. 3, 2012, Alderson, et al.
U.S. Appl. No. 13/722,119, filed Dec. 20, 2012, Hendrix, et al.
U.S. Appl. No. 13/727,718, filed Dec. 27, 2012, Alderson, et al.
U.S. Appl. No. 13/784,018, filed Mar. 4, 2013, Alderson, et al.
U.S. Appl. No. 13/787,906, filed Mar. 7, 2013, Alderson, et al.
U.S. Appl. No. 13/729,141, filed Dec. 28, 2012, Zhou, et al.
U.S. Appl. No. 13/794,931, filed Mar. 12, 2013, Lu, et al.
U.S. Appl. No. 13/794,979, filed Mar. 12, 2013, Alderson, et al.
U.S. Appl. No. 13/968,007, filed Aug. 15, 2013, Hendrix, et al.
U.S. Appl. No. 14/029,159, filed Sep. 17, 2013, Li, et al.
U.S. Appl. No. 14/062,951, filed Oct. 25, 2013, Zhou, et al.
Black, John W., "An Application of Side-Tone in Subjective Tests of Microphones and Headsets", Project Report No. NM 001 064.01.20, Research Report of the U.S. Naval School of Aviation Medicine, Feb. 1, 1954, 12 pages (pp. 1-12 in pdf), Pensacola, FL, US.
Peters, Robert W., "The Effect of High-Pass and Low-Pass Filtering of Side-Tone Upon Speaker Intelligibility", Project Report No. NM 001 064.01.25, Research Report of the U.S. Naval School of Aviation Medicine, Aug. 16, 1954, 13 pages (pp. 1-13 in pdf), Pensacola, FL, US.
Lane, et al., "Voice Level: Autophonic Scale, Perceived Loudness, and the Effects of Sidetone", The Journal of the Acoustical Society of America, Feb. 1961, pp. 160-167, vol. 33, No. 2., Cambridge, MA, US.
Liu, et al., "Compensatory Responses to Loudness-shifted Voice Feedback During Production of Mandarin Speech", Journal of the Acoustical Society of America, Oct. 2007, pp. 2405-2412, vol. 122, No. 4.
Paepcke, et al., "Yelling in the Hall: Using Sidetone to Address a Problem with Mobile Remote Presence Systems", Symposium on User Interface Software and Technology, Oct. 16-19, 2011, 10 pages (pp. 1-10 in pdf), Santa Barbara, CA, US.
Therrien, et al., "Sensory Attenuation of Self-Produced Feedback: The Lombard Effect Revisited", PLOS One, Nov. 2012, pp. 1-7, vol. 7, Issue 11, e49370, Ontario, Canada.
Pfann, et al., "LMS Adaptive Filtering with Delta-Sigma Modulated Input Signals," IEEE Signal Processing Letters, Apr. 1998, pp. 95-97, vol. 5, No. 4, IEEE Press, Piscataway, NJ.
Toochinda, et al. "A Single-Input Two-Output Feedback Formulation for ANC Problems," Proceedings of the 2001 American Control Conference, Jun. 2001, pp. 923-928, vol. 2, Arlington, VA.
Kuo, et al., "Active Noise Control: A Tutorial Review," Proceedings of the IEEE, Jun. 1999, pp. 943-973, vol. 87, No. 6, IEEE Press, Piscataway, NJ.
Johns, et al., "Continuous-Time LMS Adaptive Recursive Filters," IEEE Transactions on Circuits and Systems, Jul. 1991, pp. 769-778, vol. 38, No. 7, IEEE Press, Piscataway, NJ.
Shoval, et al., "Comparison of DC Offset Effects in Four LMS Adaptive Algorithms," IEEE Transactions on Circuits and Systems II: Analog and Digital Processing, Mar. 1995, pp. 176-185, vol. 42, Issue 3, IEEE Press, Piscataway, NJ.
Mali, Dilip, "Comparison of DC Offset Effects on LMS Algorithm and its Derivatives," International Journal of Recent Trends in Engineering, May 2009, pp. 323-328, vol. 1, No. 1, Academy Publisher.
Kates, James M., "Principles of Digital Dynamic Range Compression," Trends in Amplification, Spring 2005, pp. 45-76, vol. 9, No. 2, Sage Publications.
Gao, et al., "Adaptive Linearization of a Loudspeaker," IEEE International Conference on Acoustics, Speech, and Signal Processing, Apr. 14-17, 1991, pp. 3589-3592, Toronto, Ontario, CA.
Silva, et al., "Convex Combination of Adaptive Filters With Different Tracking Capabilities," IEEE International Conference on Acoustics, Speech, and Signal Processing, Apr. 15-20, 2007, pp. III 925-928, vol. 3, Honolulu, HI, USA.
Akhtar, et al., "A Method for Online Secondary Path Modeling in Active Noise Control Systems," IEEE International Symposium On Circuits and Systems, May 23-26, 2005, pp. 264-267, vol. 1, Kobe, Japan.
Davari, et al., "A New Online Secondary Path Modeling Method for Feedforward Active Noise Control Systems," IEEE International Conference on Industrial Technology, Apr. 21-24, 2008, pp. 1-6, Chengdu, China.
Lan, et al., "An Active Noise Control System Using Online Secondary Path Modeling With Reduced Auxiliary Noise," IEEE Signal Processing Letters, Jan. 2002, pp. 16-18, vol. 9, Issue 1, IEEE Press, Piscataway, NJ.
Liu, et al., "Analysis of Online Secondary Path Modeling With Auxiliary Noise Scaled by Residual Noise Signal," IEEE Transactions on Audio, Speech and Language Processing, Nov. 2010, pp. 1978-1993, vol. 18, Issue 8, IEEE Press, Piscataway, NJ.
U.S. Appl. No. 14/210,537, filed Mar. 14, 2014, Abdollahzadeh Milani, et al.
U.S. Appl. No. 14/210,589, filed Mar. 14, 2014, Abdollahzadeh Milani, et al.
U.S. Appl. No. 14/578,567, filed Dec. 22, 2014, Kwatra, et al.
Widrow, B., et al., Adaptive Noise Cancelling; Principles and Applications, Proceedings of the IEEE, Dec. 1975, pp. 1692-1716, vol. 63, No. 13, IEEE, New York, NY, US.
Morgan, et al., A Delayless Subband Adaptive Filter Architecture, IEEE Transactions on Signal Processing, IEEE Service Center, Aug. 1995, pp. 1819-1829, vol. 43, No. 8, New York, NY, US.
U.S. Appl. No. 14/228,322, filed Mar. 28, 2014, Alderson, et al.
U.S. Appl. No. 13/762,504, filed Feb. 8, 2013, Abdollahzadeh Milani, et al.
U.S. Appl. No. 13/721,832, filed Dec. 20, 2012, Lu, et al.
U.S. Appl. No. 13/724,656, filed Dec. 21, 2012, Lu, et al.
U.S. Appl. No. 14/252,235, filed Apr. 14, 2014, Lu, et al.
U.S. Appl. No. 13/968,013, filed Aug. 15, 2013, Abdollahzadeh Milani, et al.
U.S. Appl. No. 13/924,935, filed Jun. 24, 2013, Hellman.
U.S. Appl. No. 13/896,526, filed May 17, 2013, Naderi.
U.S. Appl. No. 14/101,955, filed Dec. 10, 2013, Alderson.
U.S. Appl. No. 14/101,777, filed Dec. 10, 2013, Alderson et al.
Abdollahzadeh Milani, et al., "On Maximum Achievable Noise Reduction in ANC Systems", 2010 IEEE International Conference on Acoustics Speech and Signal Processing, Mar. 14-19, 2010, pp. 349-352, Dallas, TX, US.
Cohen, Israel, "Noise Spectrum Estimation in Adverse Environments: Improved Minima Controlled Recursive Averaging", IEEE Transactions on Speech and Audio Processing, Sep. 2003, pp. 1-11, vol. 11, Issue 5, Piscataway, NJ, US.
Ryan, et al., "Optimum Near-Field Performance of Microphone Arrays Subject to a Far-Field Beampattern Constraint", J. Acoust. Soc. Am., Nov. 2000, pp. 2248-2255, 108 (5), Pt. 1, Ottawa, Ontario, Canada.
Cohen, et al., "Noise Estimation by Minima Controlled Recursive Averaging for Robust Speech Enhancement", IEEE Signal Processing Letters, Jan. 2002, pp. 12-15, vol. 9, No. 1, Piscataway, NJ, US.
Martin, Rainer, "Noise Power Spectral Density Estimation Based on Optimal Smoothing and Minimum Statistics", IEEE Transactions on Speech and Audio Processing, Jul. 2001, pp. 504-512, vol. 9, No. 5, Piscataway, NJ, US.
Martin, Rainer, "Spectral Subtraction Based on Minimum Statistics", Signal Processing VII Theories and Applications, Proceedings of EUSIPCO-94, 7th European Signal Processing Conference, Sep. 13-16, 1994, pp. 1182-1185, vol. III, Edinburgh, Scotland, U.K.
Booij, et al., "Virtual sensors for local, three dimensional, broadband multiple-channel active noise control and the effects on the quiet zones", Proceedings of the International Conference on Noise and Vibration Engineering, ISMA 2010, Sep. 20-22, 2010, pp. 151-166, Leuven.
Kuo, et al., "Residual noise shaping technique for active noise control systems", J. Acoust. Soc. Am. 95 (3), Mar. 1994, pp. 1665-1668.

(56) References Cited

OTHER PUBLICATIONS

Lopez-Caudana, Edgar Omar, "Active Noise Cancellation: The Unwanted Signal and the Hybrid Solution", Adaptive Filtering Applications, Dr. Lino Garcia (Ed.), Jul. 2011, pp. 49-84, ISBN: 978-953-307-306-4, InTech.

Senderowicz, et al., "Low-Voltage Double-Sampled Delta-Sigma Converters", IEEE Journal on Solid-State Circuits, Dec. 1997, pp. 1907-1919, vol. 32, No. 12, Piscataway, NJ.

Hurst, et al., "An improved double sampling scheme for switched-capacitor delta-sigma modulators", 1992 IEEE Int. Symp. On Circuits and Systems, May 10-13, 1992, vol. 3, pp. 1179-1182, San Diego, CA.

U.S. Appl. No. 14/656,124, filed Mar. 12, 2015, Hendrix, et al.

International Search Report and Written Opinion of the International Searching Authority in PCT/US2015/018742 mailed on May 15, 2015, 13 pages (pp. 1-13 in pdf).

Campbell, Mikey, "Apple looking into self-adjusting earbud headphones with noise cancellation tech", Apple Insider, Jul. 4, 2013, pp. 1-10 (10 pages in pdf), downloaded on May 14, 2014 from http://appleinsider.com/articles/13/07/04/apple-looking-into-self-adjusting-earbud-headphones-with-noise-cancellation-tech.

Jin, et al. "A simultaneous equation method-based online secondary path modeling algorithm for active noise control", Journal of Sound and Vibration, Apr. 25, 2007, pp. 455-474, vol. 303, No. 3-5, London, GB.

Erkelens, et al., "Tracking of Nonstationary Noise Based on Data-Driven Recursive Noise Power Estimation", IEEE Transactions on Audio Speech and Language Processing, Aug. 2008, pp. 1112-1123, vol. 16, No. 6, Piscataway, NJ, US.

Rao, et al., "A Novel Two State Single Channel Speech Enhancement Technique", India Conference (INDICON) 2011 Annual IEEE, IEEE, December 2011, 6 pages (pp. 1-6 in pdf), Piscataway, NJ, US.

Rangachari, et al., "A noise-estimation algorithm for highly non-stationary environments", Speech Communication, Feb. 2006, pp. 220-231, vol. 48, No. 2. Elsevier Science Publishers.

Parkins, et al., "Narrowband and broadband active control in an enclosure using the acoustic energy density", J. Acoust. Soc. Am. Jul. 2000, pp. 192-203, vol. 108, issue 1, US.

Feng, et al . . . , "A broadband self-tuning active noise equaliser", Signal Processing, Oct. 1, 1997, pp. 251-256, vol. 62, No. 2, Elsevier Science Publishers B.V. Amsterdam, NL.

Zhang, et al., "A Robust Online Secondary Path Modeling Method with Auxiliary Noise Power Scheduling Strategy and Norm Constraint Manipulation", IEEE Transactions on Speech and Audio Processing, IEEE Service Center, Jan. 1, 2003, pp. 45-53, vol. 11, No. 1, NY.

Lopez-Gaudana, et al., "A hybrid active noise cancelling with secondary path modeling", 51st Midwest Symposium on Circuits and Systems, MWSCAS 2008, Aug. 10-13, 2008, pp. 277-280, IEEE, Knoxville, TN.

U.S. Appl. No. 14/734,321, filed Jun. 9, 2015, Alderson, et al.

U.S. Appl. No. 14/840,831, filed Aug. 31, 2015, Hendrix, et al.

Rafaely, Boaz, "Active Noise Reducing Headset—an Overview", The 2001 International Congress and Exhibition on Noise Control Engineering, Aug. 27-30, 2001, 10 pages. (pp. 1-10 in pdf), The Netherlands.

Ray, et al., "Hybrid Feedforward-Feedback Active Noise Reduction for Hearing Protection and Communication", The Journal of the Acoustical Society of America, American Institute of Physics for the Acoustical Society of America, Jan. 2006, pp. 2026-2036 vol. 120, No. 4, New York, NY.

FREQUENCY-DEPENDENT SIDETONE CALIBRATION

BACKGROUND OF THE INVENTION

1. Field of the Invention

The present invention relates generally to personal audio devices such as wireless telephones, and more specifically, to calibration of sidetone in a personal audio device.

2. Background of the Invention

Telephones, such as mobile/cellular telephones and other devices in which users need to hear their own voice during use are increasing in prevalence. The injection of the user's own voice into a transducer output to which the user is listening is referred to in telephony as sidetone. Speech recognition and the increasing dependence on mobile devices with earphones or earbuds ensures that sidetone will remain an important feature of such devices.

Sidetone is desirably presented so that the user's voice is heard by the user in the headphones or other transducer, as if the transducer and housing is not covering the ear. Due to the obstruction provided by the transducer and housing, one or both ears may be partially or totally blocked, distorting and attenuating the user's voice in the ambient acoustic environment. Therefore, sidetone has been provided to remedy the problem. However, present-day sidetone does not always provide a natural sound, especially under changing transducer type, position and other environmental factors.

Therefore, it would be desirable to provide techniques for improving the quality of sidetone provided in personal audio devices.

SUMMARY OF THE INVENTION

The above-stated objective of providing improved sidetone operation in personal audio devices, is accomplished in a system, such as a personal audio device, a method of operation, and an integrated circuit that implements the functions of the system.

The personal audio device includes a first microphone for receiving speech and a sidetone circuit for generating a sidetone signal from the output of the first microphone. The sidetone circuit has one or more adjustable coefficients for altering the relationship between the first microphone signal and the sidetone signal. The personal audio device also includes a transducer for reproducing playback audio and the sidetone signal at an ear of a listener and a second microphone for measuring the output of the transducer as delivered to the ear of the listener. The sidetone circuit includes a calibration circuit for estimating a response of the second microphone to the sidetone signal and adjusting the coefficient of the sidetone circuit according to the estimated response.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

Figure 1A:
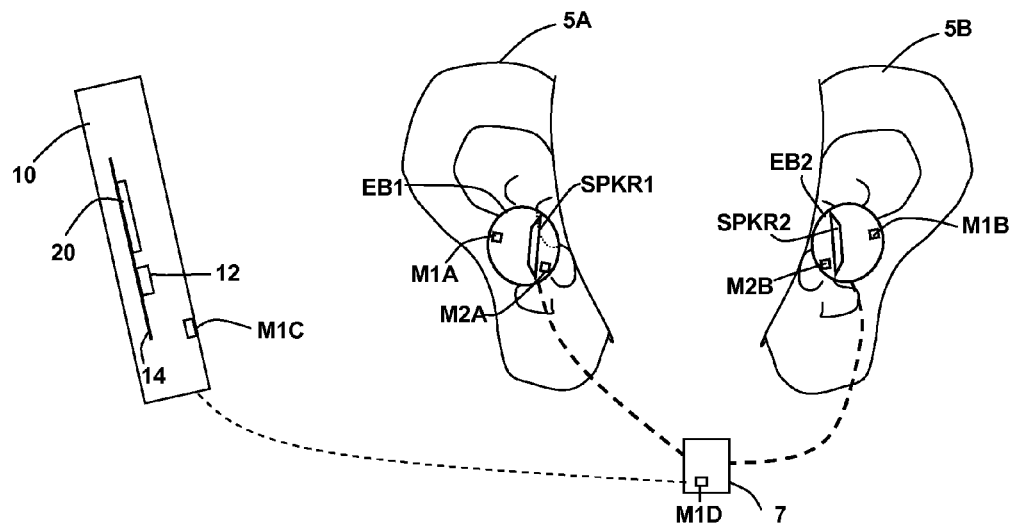
FIG. 1A is an illustration of a wireless telephone 10 coupled to a pair of earbuds EB1 and EB2, which is an example of a personal audio system, in which the techniques disclosed herein can be implemented.

The present disclosure reveals techniques and circuits that can be implemented in a system, such as a personal audio device, e.g., wireless headphones, a wireless telephone, an Internet protocol (IP) or other telephone handset, a gaming headset, or a communications headset for aircraft, motorcycle or automotive system, in which sidetone is implemented. The personal audio device includes a sidetone circuit that has one or more adjustable parameters that are calibrated for the particular equipment, configuration, physical position and/or ambient environment to improve the user's perception of their own voice via the sidetone information. The calibration may be performed in response to a user command or in in response to a voice-activity detector (VAD) indicating that no near speech is present. If a VAD is used to trigger calibration, when no near speech is present, no sidetone is required, so calibration can be conducted without disrupting normal operation. Frequency shaping may be included in the form of low-pass, high-pass and/or band-pass filtering of the user's speech to generate the sidetone and may also include a low-frequency cut filter that compensates for the low-frequency enhancement provided by bone conduction from the transducer(s) to the inner ear.

The sidetone may be presented (along with playback audio such as downlink audio) by a stereo headset including two monaural earphones, each having a speaker, a first microphone to capture the voice of the user, and a second microphone to capture sounds reaching the user's ear. The sidetone generating apparatus operates on the signals generated by the microphones to optimize the sound level and frequency content of the user's voice that is heard by the user via the speaker. Alternatively, instead of providing a microphone on each earphone to capture the voice of the user, the voice microphone may be a single microphone provided near the user's mouth, e.g., on a boom or a lanyard. In another alternative, the sidetone may be presented by a wireless telephone having a transducer on the housing of the wireless telephone, and with a first microphone to capture the user's voice and a second microphone for capturing the output of the transducer to approximate the sound heard by the user's ear.

The sidetone generating system in any of the above configurations may be implemented with or without active noise cancellation (ANC) circuits, which can use the microphones to form part of the ambient noise and ANC error measurements. One or more of the parameters derived for ANC operation, such as a secondary-path response estimate, may be used in determining the gain and/or frequency response to be applied to the sidetone signal. Alternatively, or in combination, ambient noise reduction can be provided by the monaural earphones sealing the ear canal or sealing over the ear. The sidetone generating apparatus may equalize the sound level of the user's voice as detected by the first and second microphones and may include an additional pre-set gain offset appropriate to the method of noise reduction and the position of the microphone that detects the sound reaching the user's ear. As yet another alternative, the sidetone generating apparatus may equalize the sound level of the user's voice as detected by the first and second microphones and further allow for manual user control of gain offset in order to achieve the most desirable sidetone level.

FIG. 1A shows a wireless telephone 10 and a pair of earbuds EB1 and EB2, each inserted in a corresponding ear 5A, 5B of a listener. Illustrated wireless telephone 10 is an example of a device in which the techniques herein may be employed, but it is understood that not all of the elements or configurations illustrated in wireless telephone 10, or in the circuits depicted in subsequent illustrations, are required. In particular, some or all of the circuits illustrated below as being within wireless telephone 10 may alternatively be implemented in a cord-mounted module that interconnects earbuds EB1, EB2 in a wired configuration, or implemented within earbuds EB1, EB2 themselves. Wireless telephone 10 is connected to earbuds EB1, EB2 by a wired or wireless connection, e.g., a BLUETOOTH™ connection (BLUETOOTH is a trademark of Bluetooth SIG, Inc.). Earbuds EB1, EB2 each has a corresponding transducer, such as speakers SPKR1, SPKR2, which reproduce source audio including distant speech received from wireless telephone 10, ringtones, stored audio program material, and sidetone, which is injection of near-end speech (i.e., the speech of the user of wireless telephone 10). The source audio also includes any other audio that wireless telephone 10 is required to reproduce, such as source audio from web-pages or other network communications received by wireless telephone 10 and audio indications such as battery low and other system event notifications.

First microphones M1A, M1B is provided on a surface of the housing of respective earbuds EB1, EB2 for receiving the speech of the user, and may alternatively be mounted on a boom, or located within a cord-mounted module 7. In embodiments that include adaptive noise-canceling (ANC) as described below, first microphones M1A, M1B also serve as reference microphones for measuring the ambient acoustic environment. Second microphones M2A, M2B, are provided in order to measure the audio reproduced by respective speakers SPKR1, SPKR2 close to corresponding ears 5A, 5B, when earbuds EB1, EB2 are inserted in the outer portion of ears 5A, 5B, so that the listener's perception of the sound reproduced by speakers SPKR1, SPKR2 can be more accurately modeled. In particular, the determination of the response of sidetone information as heard by the user is utilized in the circuits described below. Second microphones M2A, M2B may function as error microphones in embodiments that include ANC as described below, providing a measure of the ambient noise canceling performance of the ANC system in addition to estimating the sidetone as heard by the user.

Figure 1B:
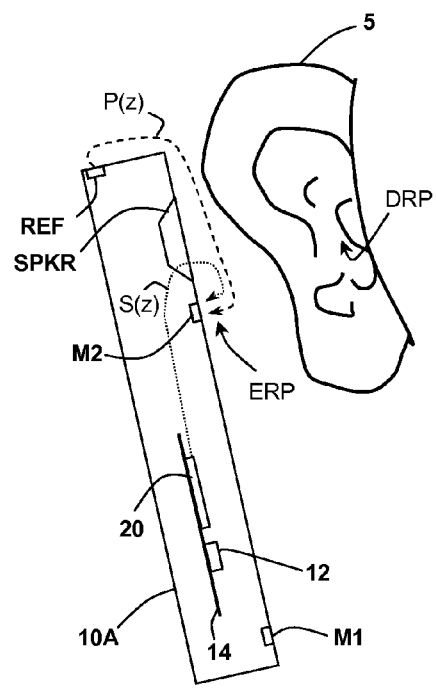
FIG. 1B is an illustration of a wireless telephone 10A, in which the techniques disclosed herein can be implemented.

Wireless telephone 10 includes circuits and features performing the sidetone calibration and equalization as described below, in addition to optionally providing ANC functionality. An exemplary circuit 14 within wireless telephone 10 includes an audio integrated circuit 20 that receives the signals from first microphones M1A, M1B, second microphones M2A, M2B, and interfaces with other integrated circuits such as an RF integrated circuit 12 containing the wireless telephone transceiver. An alternative location places a microphone M1C on the housing of wireless telephone 10 or a microphone M1D on cord-mounted module 7. In other implementations, the circuits and techniques disclosed herein may be incorporated in a single integrated circuit that contains control circuits and other functionality for implementing the entirety of the personal audio device, such as an MP3 player-on-a-chip integrated circuit, or a wireless telephone implemented within a single one of earbuds EB1, EB2. In other embodiments, as illustrated in FIG. 1B below, a wireless telephone 10A includes the first and second microphones and speaker and the sidetone calibration, and equalization is performed by an integrated circuit within wireless telephone 10. For the purposes of illustration, the sidetone circuits will be described as provided within wireless telephone 10, but the above variations are understandable by a person of ordinary skill in the art and the consequent signals that are required between earbuds EB1, EB2, wireless telephone 10, and a third module, if required, can be easily determined for those variations.

FIG. 1B shows an exemplary wireless telephone 10A, which includes a speaker SPKR in proximity to a human ear 5. Illustrated wireless telephone 10A is an example of a device in which techniques illustrated herein may be employed, but it is understood that not all of the elements or configurations embodied in illustrated wireless telephone 10A, or in the circuits depicted in subsequent illustrations, are required. Wireless telephone 10A includes a transducer such as a speaker SPKR that reproduces distant speech received by wireless telephone 10A, along with other local audio events such as ringtones, stored audio program material, near-end speech, sources from web-pages or other network communications received by wireless telephone 10 and audio indications such as battery low and other system event notifications. A microphone M1 is provided to capture near-end speech, which is transmitted from wireless telephone 10A to the other conversation participant(s).

Wireless telephone 10A includes sidetone circuits as described herein and may also include ANC circuits and features as described herein that inject an anti-noise signal into speaker SPKR to improve intelligibility of the distant speech and other audio reproduced by speaker SPKR. Further, FIG. 1B illustrates various acoustic paths and points of reference that are also present in the system of FIG. 1A, but are illustrated only in FIG. 1B for clarity. Therefore, the discussion below is also applicable in the system of FIG. 1A and is understood to apply to earphone-based applications as well as housing-mounted-transducer applications. A second microphone, microphone M2, is provided in order to measure the audio reproduced by speaker SPKR close to ear 5, when wireless telephone 10 is in close proximity to ear 5, in order to perform sidetone calibration, and in ANC applications, to provide an error signal indicative of the ambient audio sounds as heard by the user. Ideally, the sidetone signal is optimized for the best frequency response and gain at a drum reference position DRP which represents the sound heard by the listener. Microphone M2 measures the audio at an error reference position ERP, and the sidetone can be calibrated to obtain a desired result at error reference position ERP. Fixed equalization can be used to adjust the sidetone response to optimize the sidetone present at drum reference position DRP, and to additionally compensate for bone conduction due to contact between earbuds EB1, EB2 in the system of FIG. 1A or contact with the housing of wireless telephone 10A in the system of FIG. 1B. Wireless telephone 10A also includes audio integrated circuit 20 that receives the signals from a reference microphone REF, microphone M1, and microphone M2 and interfaces with other integrated circuits such as RF integrated circuit 12. In other implementations, the circuits and techniques disclosed herein may be incorporated in a single integrated circuit that contains control circuits and other functionality for implementing the entirety of the personal audio device, such as an MP3 player-on-a-chip integrated circuit. A third microphone, reference microphone REF, is optionally provided for measuring the ambient acoustic environment in ANC application and is positioned away from the typical position of a user's mouth, so that the near-end speech is minimized in the signal produced by reference microphone REF. A primary acoustic path P(z) illustrates the response that is modeled adaptively in an ANC system in order to cancel ambient acoustic noise at error reference position ERP, and a secondary electro-acoustic path S(z) illustrates the response that is modeled in the instant disclosure for both sidetone equalization and for ANC operations that represents the transfer function from audio integrated circuit 20 through speaker SPKR and through microphone M2.

The circuits and systems shown below calibrate and apply equalization (EQ) to apply a a response $H_{ST}(z)$ to a signal generated by microphone M1 (or microphones M1A, M1B), in order to generate sidetone information that is eventually reproduced by speaker SPKR (or speakers SPKR1, SPKR2). The goal of optimizing the sidetone response is to give the listener the experience of hearing their own voice as if no occlusion by earbuds EB1, EB2 or wireless telephone 10A is present. Table I below shows the transfer functions make up the acoustic and electrical paths involved in producing the sidetone as heard by the listener:

TABLE I

| | |
|---|---|
| $H_{ME}(z)$ | The acoustic response from the listener's mouth to ear in normal conversation (no occlusion) |
| $H_{BCO}(z)$ | Bone conduction from the transducer to the listener's ear when the listener's ear is occluded |
| $H_{VxSpkr}(z)$ | Voice microphone acoustical input to the electrical output to the transducer |
| SE (z) | Secondary path response: the electro acoustic path from the electrical output to the transducer to the error microphone |
| $H_{ERP \cdot DRP}(z)$ | The acoustical transformation from the error microphone (ERP) to the eardrum position (DRP) |
| $H_{ANCG}$ | Changes in the response due to active ANC, if present. |

The goal of the sidetone calibration is to make the sidetone sound as if transformed from the listener's mouth to drum reference position DRP only by $H_{ME}(z)$, which requires:

$$H_{ST}(z) = H_{VxSpkr}^{-1} \cdot H_{BCO}^{-1} \cdot SE^{-1} \cdot H_{ERP \cdot DRP}^{-1} \cdot H_{ME} \cdot H_{ANCG}$$

Of the various responses listed in Table I, $H_{ME}(z)$ and $H_{VxSpker}(z)$ can generally be determined a priori with sufficient accuracy. Response SE(z) can be estimated accurately by the circuits disclosed below. Dynamically, $H_{BCO}(z)$ and $H_{ERP \cdot DRP}(z)$ can be roughly determined by looking up values determined from experimental "standard head" measurement data according to the estimated secondary path response SE(z). In the calibrations described below, the value of $H_{ST}(z)$ is determined by estimating the secondary path response S to yield response SE(z) and then using the predetermined response and response determined by look-up or other modeling from response SE(z) to compute the equalization $H_{ST}(z)$ to be applied to the sidetone signal. In some implementations, only a gain for $H_{ST}(z)$ is determined; in other implementations, $H_{ST}(z)$ will be a frequency-dependent and optionally phase-dependent response. Other formulations estimating fewer of the responses given above are possible, for example, $H_{BCO}(z)$ could be assumed as a fixed response, and a low-cut filter applied in conjunction with the equalization in order to compensate for bone conduction.

Figure 2:
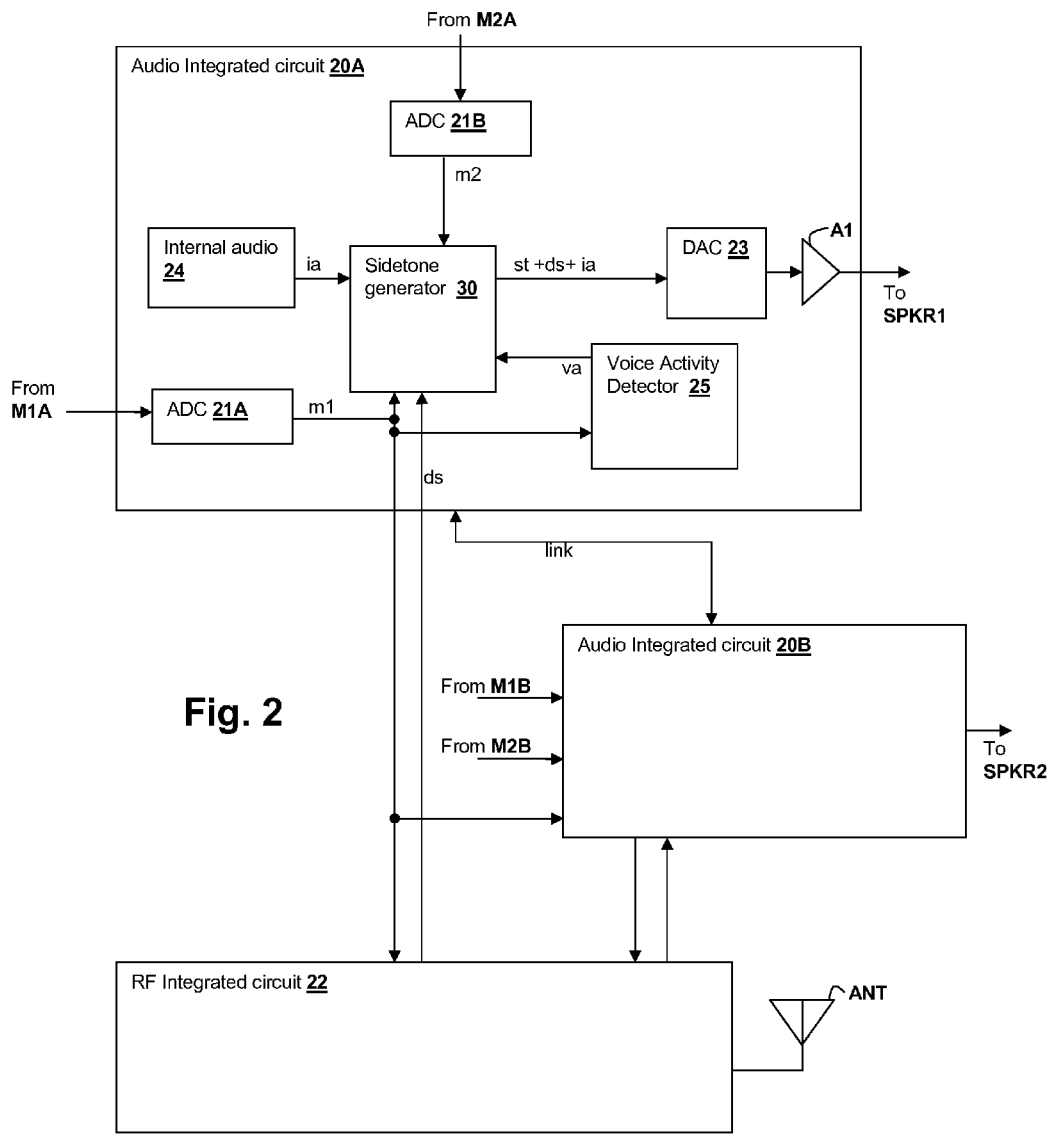
FIG. 2 is a block diagram of circuits that can be implemented within one or more of wireless telephone 10, cord-mounted module 7, and/or earbuds EB1-EB2 of FIG. 1A and within wireless telephone 10A of FIG. 1B.

Referring now to FIG. 2, circuits within earbuds EB1, EB2 and wireless telephone 10 are shown in a block diagram. The circuit shown in FIG. 2 further applies to the other configurations mentioned above, except that signaling between CODEC integrated circuit 20 and other units within wireless telephone 10 are provided by cables or wireless connections when audio integrated circuits 20A, 20B are located outside of wireless telephone 10, e.g., within corresponding earbuds EB1, EB2. In such a configuration, signaling between a single integrated circuit 20 that implements integrated circuits 20A-20B and error microphones E1, E2, reference microphones R1, R2 and speakers SPKR1, SPKR2 are provided by wired or wireless connections when audio integrated circuit 20 is located within wireless telephone 10. In the illustrated example, audio integrated circuits 20A, 20B are shown as separate and substantially identical circuits, so only audio integrated circuit 20A will be described in detail below.

Audio integrated circuit 20A includes an analog-to-digital converter (ADC) 21A for receiving the first microphone signal from reference microphone M1A and generating a digital representation m1 of the first microphone signal. Audio integrated circuit 20A also includes an ADC 21B for receiving the second microphone signal from second microphone M2A and generating a digital representation m2 of the second microphone. Audio integrated circuit 20B may receive the digital representation of microphone signal m1 from audio integrated circuit 20A via the wireless or wired connections as described above in applications in which only one ambient microphone is provided on the housing of one of earbuds EB1, EB2. Audio integrated circuit 20A generates an output for driving speaker SPKR1 from an amplifier A1, which amplifies the output of a digital-to-analog converter (DAC) 23 that receives the output st+ds+ia of a sidetone generator 30 that contains audio signals is from internal audio sources 24, sidetone information st and downlink speech ds provided from a radio frequency (RF) integrated circuit 22. Sidetone generator 30 optimizes the gain and/or frequency response of sidetone information st with respect to microphone signal m1 so that the user of wireless telephone 10 hears their own voice in proper relation to downlink speech ds. Microphone signal m1 is also provided to RF integrated circuit 22 and is transmitted as uplink speech to the service provider via an antenna ANT. In any of the configurations described above, the microphone signal from microphone M1A can be replaced by microphone signal from any of microphones M1 and M1B-M1D as illustrated in FIGS. 1A-1B. Sidetone generator 30 is calibrated by measuring a response at second microphones M2A, M2B to the sidetone information st reproduced by speakers SPKR1, SPKR2. The calibration may be performed periodically, at start-up, in response to a user command, or in response to a voice activity detector 25 detecting that voice activity has commenced, and thus speech information is present for training the frequency response and gain of sidetone generator 30.

Figure 3:
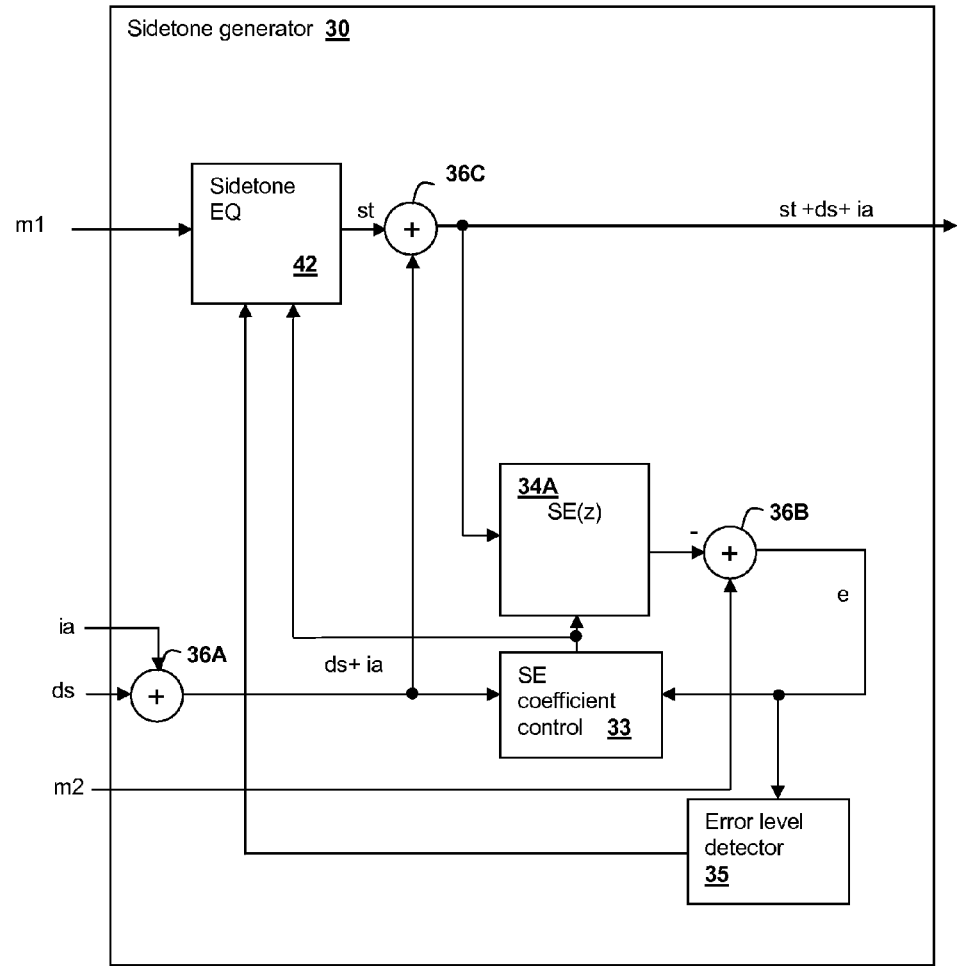
FIG. 3 is a block diagram depicting signal processing circuits and functional blocks within sidetone generator 30 circuit of audio integrated circuits 20A-20B of FIG. 2.

Referring now to FIG. 3, details of an exemplary sidetone generator circuit 30 within audio integrated circuits 20A and 20B of FIG. 2, are shown. A sidetone equalizer (EQ) 42 receives microphone signal m1 and applies a frequency response $H_{ST}(z)$ and/or gain to microphone signal m1 to generate sidetone information st. Sidetone EQ 42 is generally a multi-band filter that may be provided by a finite impulse response (FIR) filter designed in multiple channels, or having coefficients that generate a response determined by a desired response curve extending over the multiple frequency bands. Control circuits within sidetone EQ 42 receive the output of a secondary path estimate coefficient control 33 and use the secondary path estimated response, at least in part, to determine a response $H_{ST}(z)$ to be applied to microphone signal m1 in order to generate the sidetone information st. Downlink speech ds is combined with internal audio information is by a combiner 36A to produce a source audio signal ds+ia, and a combiner 36C combines source audio signal ds+ia with sidetone information st to produce output st+ds+ia of sidetone generator 30. The combined source audio and sidetone information output signal st+ds+ia is provided to the input of a secondary path adaptive filter 34A that has a response SE(z) controlled by an SE coefficient control block 33. SE coefficient control block 33 receives the output of combiner 36A, which is source audio signal ds+ia, so that the sidetone information st does not affect the estimated secondary response SE(z) of secondary path adaptive filter 34A.

In addition to source audio ds+ia, SE coefficient control block 33, receives a version of microphone signal m2 from which components of combined source audio and sidetone information output signal st+ds+ia have been removed by a combiner 36B. The components of source audio and sidetone removed by combiner 36B have been filtered by secondary path adaptive filter 34A to represent the expected source audio and sidetone delivered to error microphone E from microphone signal m2. SE coefficient control block 33 compares error signal e and source audio ds+ia to minimize components that are correlated between them. Adaptive filter 34A is thereby adapted to generate an output signal from combined source audio and sidetone information st+ds+ia, that when subtracted from microphone signal m2, contains the content of microphone signal m2 that is not due to source audio ds+ia or sidetone information st, which is an error signal e. Since the output of SE coefficient control block 33 represents an estimate SE(z) of secondary acoustic path S, sidetone EQ 42 can use one or more of the coefficients to control the frequency response $H_{ST}(z)$ applied to microphone signal m1 to generate sidetone information st. An error level detector 35 provides an indication of the level of error signal e to sidetone EQ 42 and can be used to control sidetone EQ 42 to assert default parameters, trigger calibration, or perform other corrective action if error signal e is too high in amplitude.

Figure 4:
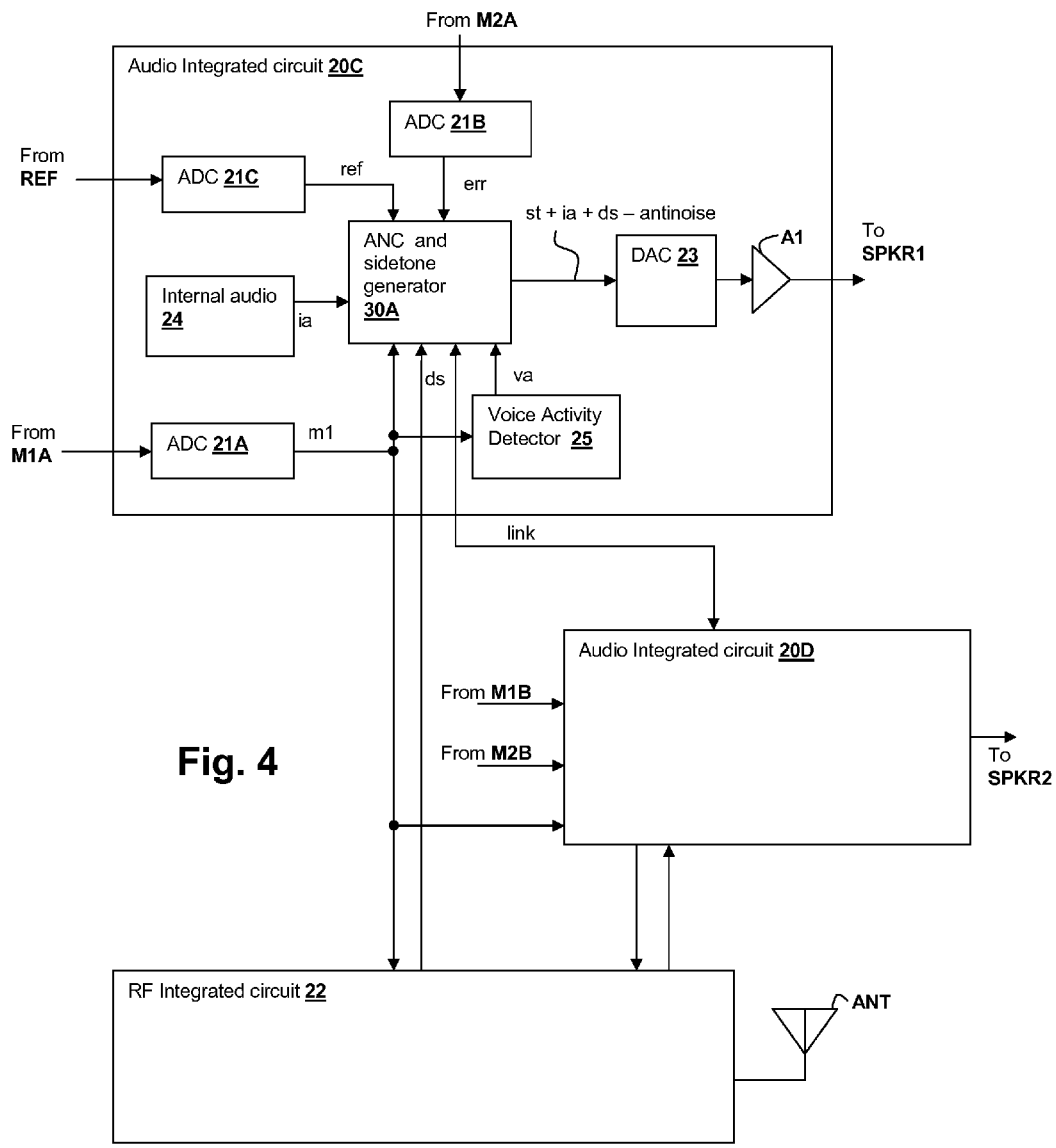
FIG. 4 is a block diagram of alternative circuits that can be implemented within one or more of wireless telephone 10, cord-mounted module 7, and/or earbuds EB1-EB2 of FIG. 1A and within wireless telephone 10A of FIG. 1B and that include adaptive noise canceling (ANC).

Referring now to FIG. 4, circuits within earbuds EB1, EB2 and wireless telephone 10 are shown in a block diagram in accordance with another example. The circuit shown in FIG. 4 is similar to the configuration shown in FIG. 2 and described above, except that ANC capability is additionally included within audio integrated circuits 20C, 20D that implement sidetone generation in the system of FIG. 4. Therefore, only differences between the system of FIG. 2 and the system of FIG. 4 will be described below. In the system of FIG. 4, ANC and sidetone generator circuit 30A replaces sidetone generator 30 and provides an output st+ds+ia-antinoise that includes an anti-noise cancellation signal generated by an ANC circuit within ANC and sidetone generator circuit 30A. In order to provide a measure of ambient noise for the ANC circuit to operate on, a signal from reference microphone REF is provided to an ADC 21C that generates a digital representation ref of the reference microphone signal, which is provided to ANC and sidetone generator circuit 30A.

Figure 5:
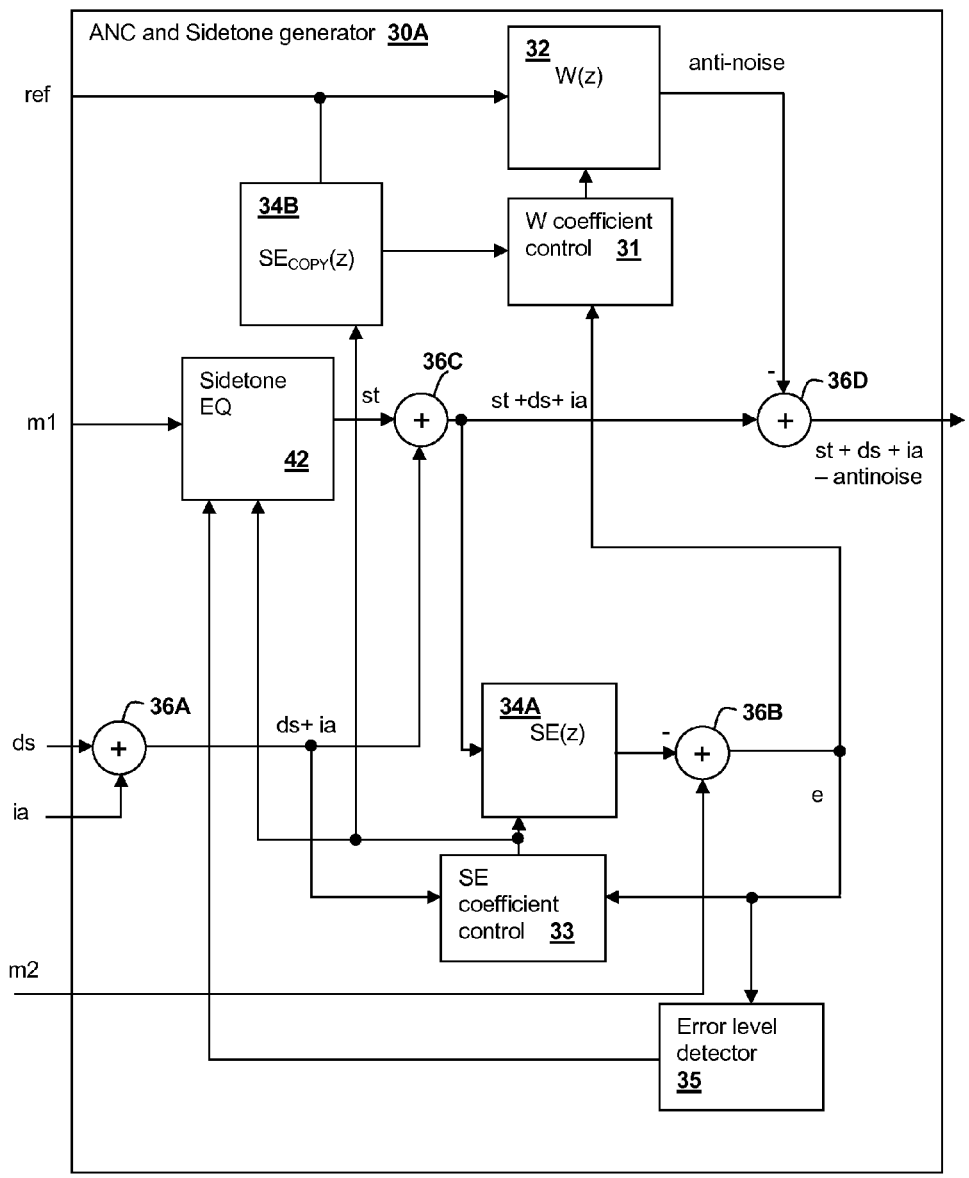
FIG. 5 is a block diagram depicting signal processing circuits and functional blocks within adaptive noise-canceling (ANC) and sidetone generator block 30A of audio integrated circuits 20C-20D of FIG. 4.

Referring now to FIG. 5, details of an exemplary ANC and sidetone generator circuit 30A within audio integrated circuits 20C and 20D of FIG. 4, are shown. The exemplary ANC and sidetone generator circuit 30A shown in FIG. 5 is similar to sidetone generator 30 shown in FIG. 3 and described above. Therefore, only differences between the circuit of FIG. 3 and the circuit of FIG. 5 will be described below. In ANC and sidetone generator circuit 30A, an adaptive filter 32 receives reference microphone signal ref and under ideal circumstances, adapts its transfer function W(z) to be P(z)/S(z) to generate the anti-noise signal anti-noise, which is provided to output combiner 36D that combines the anti-noise signal with the combined sidetone and source audio st+ds+ia to generate an output signal st+ds+ia-antinoise to be reproduced by the transducer. The coefficients of adaptive filter 32 are controlled by a W coefficient control block 31 that uses a correlation of error signal e and reference microphone signal ref to determine the response of adaptive filter 32, which generally minimizes the error, in a least-mean squares sense, between those components of reference microphone signal ref present in error microphone signal err. The reference microphone signal ref provided to coefficient control block 31 is shaped by a copy of an estimate of the response of path S(z) provided by filter 34B, so that the ambient noise measured by reference microphone REF is referenced at the position of microphone M2. In the implementation shown in FIG. 1A, reference microphone signal ref can be replaced with microphone signal m1, since microphones M1A, M1B provide a measure of ambient noise.

Figure 6:
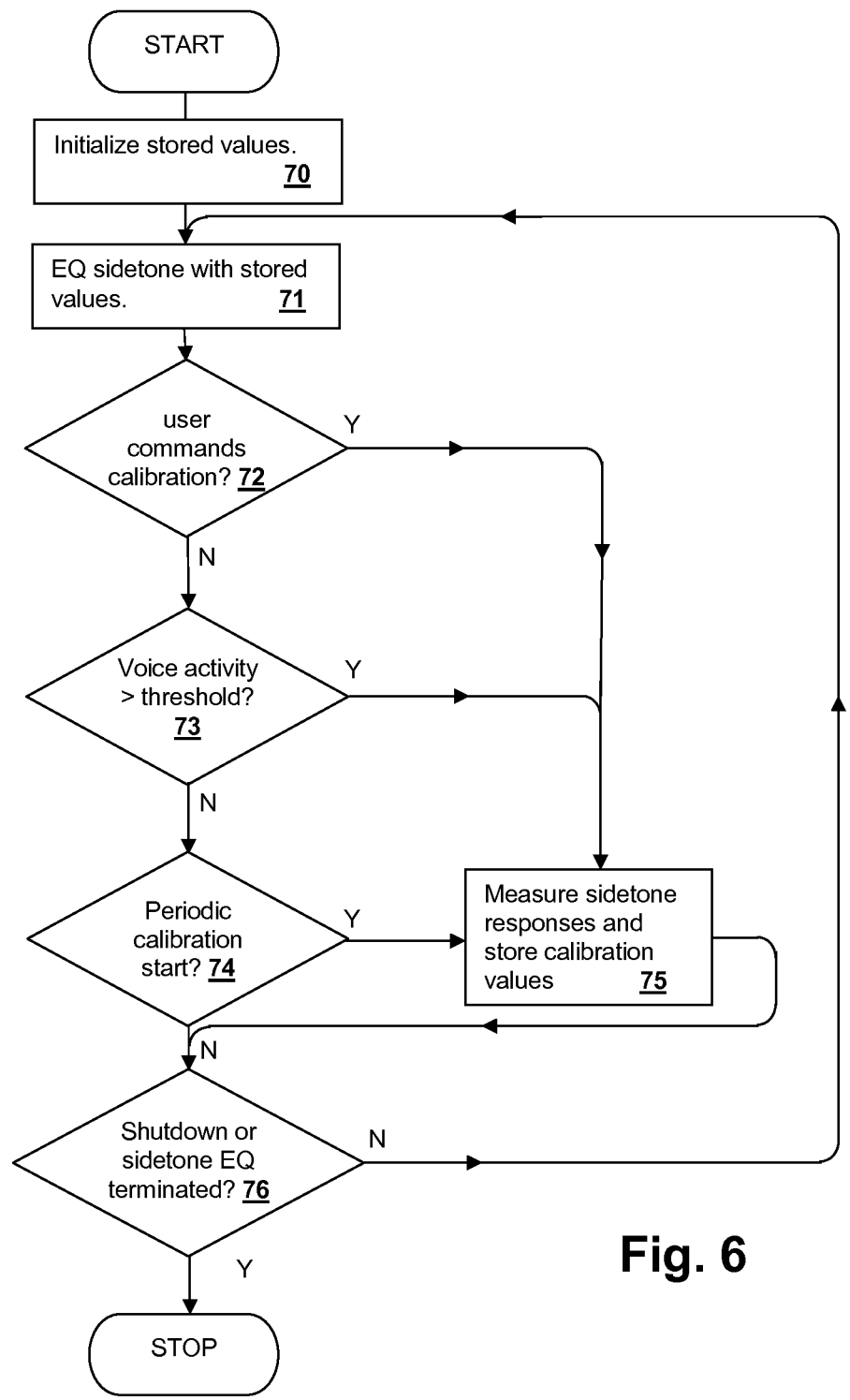
FIG. 6 is a flowchart illustrating a calibration method that may be performed by the sidetone circuits of FIGS. 2-5.

Referring to FIG. 6, a method of calibrating the systems depicted in FIGS. 1A-1B and 2-6 is illustrated in a flowchart. The system is initialized with previously-stored or predetermined response values for sidetone EQ (step 70), and the sidetone is equalized using the stored values (step 71). If the user commands calibration (decision 72), if the voice activity is over a threshold (decision 73) or a periodic calibration interval has expired (decision 74), then the sidetone responses are measured and new calibration values are stored (step 75). Until the system is shut down or the sidetone EQ scheme is terminated (decision 76), the process of steps 70-75 is repeated.

Figure 7:
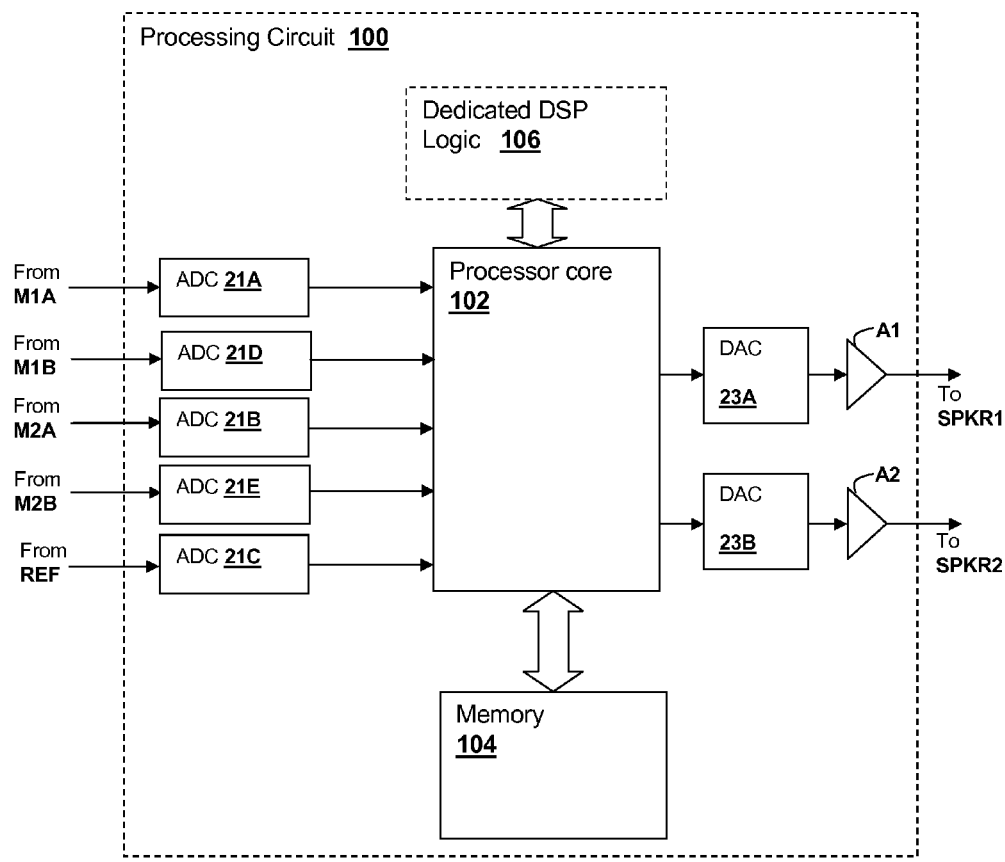
FIG. 7 is a block diagram depicting signal processing circuits and functional blocks within an integrated circuit implementing audio integrated circuits 20A-20B as disclosed herein.

Referring now to FIG. 7, a block diagram of an ANC system is shown for implementing ANC techniques as depicted in FIG. 3 and having a processing circuit 100 as may be implemented within audio integrated circuits 20A, 20B of FIG. 2 and audio integrated circuits 20C, 20D of FIG. 4, which is illustrated as combined within one circuit, but could be implemented as two or more processing circuits that intercommunicate. Processing circuit 100 includes a processor core 102 coupled to a memory 104 in which are stored program instructions comprising a computer program product that may implement some or all of the above-described ANC techniques, as well as other signal processing. Optionally, a dedicated digital signal processing (DSP) logic 106 may be provided to implement a portion of, or alternatively all of, the ANC signal processing provided by processing circuit 100. Processing circuit 100 also includes ADCs 21A-21E, for receiving inputs from microphones M1A, M1B, M2A, M2B and reference microphone REF. In alternative embodiments in which one or more of microphones M1A, M1B, M2A, M2B and reference microphone REF have digital outputs or are communicated as digital signals from remote ADCs, the corresponding ones of ADCs 21A-21E are omitted and the digital microphone signal(s) are interfaced directly to processing circuit 100. A DAC 23A and amplifier A1 are also provided by processing circuit 100 for providing the speaker output signal to speaker SPKR1, including anti-noise as described above. Similarly, a DAC 23B and amplifier A2 provide another speaker output signal to speaker SPKR2. The speaker output signals may be digital output signals for provision to modules that reproduce the digital output signals acoustically.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A system, comprising:
    a first microphone for receiving speech and generating a first microphone signal;
    a sidetone circuit for generating a sidetone signal from the first microphone signal, wherein the sidetone circuit has at least one adjustable coefficient for altering a relationship between the first microphone signal and the sidetone signal;
    a transducer for reproducing downlink audio and the sidetone signal at an ear of a listener;
    a second microphone for measuring an output of the transducer as delivered to the ear of the listener and generating a second microphone signal; and
    a calibration circuit for estimating a response of the second microphone signal to the sidetone signal and adjusting the adjustable coefficient of the sidetone circuit in conformity with the estimated response.

2. The system of claim 1, wherein the adjustable coefficient of the sidetone circuit is a gain applied to the first microphone signal to generate the sidetone signal.

3. The system of claim 1, wherein the adjustable coefficient of the sidetone circuit is a frequency-dependent response applied to the first microphone signal to generate the sidetone signal.

4. The system of claim 1, further comprising an adaptive noise reduction circuit that generates an anti-noise signal for canceling ambient audio sounds using at least one adaptive filter, wherein the adaptive noise reduction circuit generates the anti-noise signal in conformity with the second microphone signal, and wherein the calibration circuit estimates the response of the second microphone signal to the sidetone signal from coefficients of the at least one adaptive filter.

5. The system of claim 4, further comprising a reference microphone for measuring the ambient audio sounds and generating a reference microphone signal, wherein the at least one adaptive filter comprises a first adaptive filter for filtering the reference microphone signal to generate the anti-noise signal and a secondary path adaptive filter for filtering the downlink audio with an adaptive secondary path response, wherein the adaptive noise reduction circuit further comprises a combiner that removes the filtered downlink audio from the second microphone signal to produce an error signal representative of the ambient audio sounds at the transducer, wherein the calibration circuit estimates the response of the second microphone signal to the sidetone signal according to the secondary path response.

6. The system of claim 1, wherein the transducer and the second microphone are mounted in a wearable earpiece of the system.

7. The system of claim 6, further comprising:
    a second transducer for reproducing second downlink audio and a second sidetone signal at another ear of the listener; and
    a third microphone for measuring an output of the second transducer as delivered to the other ear of the listener and generating a third microphone signal, wherein the sidetone circuit further generates the second sidetone signal from the first microphone signal, wherein the sidetone circuit has at least one second adjustable coefficient for altering a second relationship between the first microphone signal and the second sidetone signal, wherein the calibration circuit further estimates a second response of the third microphone signal to the second sidetone signal and adjusts the at least one second adjustable coefficient of the sidetone circuit in conformity with the estimated response.

8. The system of claim 7, wherein the calibration circuit further adjusts a balance between the sidetone signal and the second sidetone signal.

9. The system of claim 1, wherein the system is a telephone further comprising a housing, wherein the transducer is mounted on the housing, wherein the second microphone is mounted on the housing proximate the transducer, and wherein the first microphone is mounted on the housing.

10. An integrated circuit, comprising:
    a first input for receiving a first microphone signal containing speech;
    a sidetone circuit for generating a sidetone signal from the first microphone signal, wherein the sidetone circuit has at least one adjustable coefficient for altering a relationship between the first microphone signal and the sidetone signal;
    an output for providing an output signal containing downlink audio and the sidetone signal to a transducer for reproduction at an ear of a listener;
    a second input for receiving a second microphone signal indicative of an output of the transducer as delivered to the ear of the listener; and
    a calibration circuit for estimating a response of the second microphone signal to the sidetone signal and adjusting the adjustable coefficient of the sidetone circuit in conformity with the estimated response.

11. The integrated circuit of claim 10, wherein the adjustable coefficient of the sidetone circuit is a gain applied to the first microphone signal to generate the sidetone signal.

12. The integrated circuit of claim 10, wherein the adjustable coefficient of the sidetone circuit is a frequency-dependent response applied to the first microphone signal to generate the sidetone signal.

13. The integrated circuit of claim 10, further comprising an adaptive noise reduction circuit that generates an anti-noise signal for canceling ambient audio sounds using at least one adaptive filter, wherein the adaptive noise reduction circuit generates the anti-noise signal in conformity with the second microphone signal, and wherein the calibration circuit estimates the response of the second microphone signal to the sidetone signal from coefficients of the at least one adaptive filter.

14. The integrated circuit of claim 13, further comprising a reference microphone input for receiving a reference microphone signal indicative of the ambient audio sounds, wherein the at least one adaptive filter comprises a first adaptive filter for filtering the reference microphone signal to generate the anti-noise signal and a secondary path adaptive filter for filtering the downlink audio with an adaptive secondary path response, wherein the adaptive noise reduction circuit further comprises a combiner that removes the filtered downlink audio from the second microphone signal to produce an error signal representative of the ambient audio sounds at the transducer, wherein the calibration circuit estimates the response of the second microphone signal to the sidetone signal according to the secondary path response.

15. The integrated circuit of claim 14, further comprising:
a second output for providing a second output signal to a second transducer for reproducing second downlink audio and a second sidetone signal at another ear of the listener; and
a third input for receiving a third microphone signal indicative of an output of the second transducer as delivered to the other ear of the listener, wherein the sidetone circuit further generates the second sidetone signal from the first microphone signal, wherein the sidetone circuit has at least one second adjustable coefficient for altering a second relationship between the first microphone signal and the second sidetone signal, wherein the calibration circuit further estimates a second response of the third microphone signal to the second sidetone signal and adjusts the at least one second adjustable coefficient of the sidetone circuit in conformity with the estimated response.

16. The integrated circuit of claim 15, wherein the calibration circuit further adjusts a balance between the sidetone signal and the second sidetone signal.

17. A method for providing sidetone in a system, the method comprising:
receiving speech with a first microphone to generate a first microphone signal;
generating a sidetone signal from the first microphone signal according to at least one adjustable coefficient for altering a relationship between the first microphone signal and the sidetone signal;
reproducing downlink audio and the sidetone signal at an ear of a listener with a transducer;
measuring an output of the transducer as delivered to the ear of the listener with a second microphone to generate a second microphone signal; and
estimating a response of the second microphone signal to the sidetone signal and adjusting the adjustable coefficient in conformity with the estimated response with a calibration circuit.

18. The method of claim 17, wherein the adjustable coefficient is a gain applied to the first microphone signal to generate the sidetone signal.

19. The method of claim 17, wherein the adjustable coefficient is a frequency-dependent response applied to the first microphone signal to generate the sidetone signal.

20. The method of claim 17, further comprising:
generating an anti-noise signal for canceling ambient audio sounds by adapting at least one adaptive filter, wherein the generating generates the anti-noise signal in conformity with the second microphone signal, and wherein the reproducing combines the anti-noise signal with the downlink audio and the sidetone signal; and
estimating the response of the second microphone signal to the sidetone signal from coefficients of the at least one adaptive filter.

21. The method of claim 17, further comprising:
measuring the ambient audio sounds with a reference microphone to generate a reference microphone signal;
adapting an adaptive filter that filters the reference microphone signal to generate the anti-noise signal;
filtering the downlink audio with an adaptive secondary path response;
removing the filtered downlink audio from the second microphone signal to produce an error signal representative of the ambient audio sounds at the transducer, wherein the adapting adapts the adaptive filter according to the error signal; and
estimating the response of the second microphone signal to the sidetone signal according to the secondary path response.

22. The method of claim 17, wherein the transducer and the second microphone are mounted in a wearable earpiece of the system.

23. The method of claim 22, further comprising:
reproducing second downlink audio and a second sidetone signal at another ear of the listener;
measuring an output of the second transducer as delivered to the other ear of the listener and generating a third microphone signal;
generating the second sidetone signal from the first microphone signal according to at least one second adjustable coefficient;
altering a second relationship between the first microphone signal and the second sidetone signal; and
estimating a second response of the third microphone signal to the second sidetone signal and adjusting the at least one second adjustable coefficient in conformity with the estimated response.

24. The method of claim 23, further comprising adjusting a balance between the sidetone signal and the second sidetone signal.

25. The method of claim 17, wherein the system is a telephone further comprising a housing, wherein the transducer is mounted on the housing, wherein the second microphone is mounted on the housing proximate the transducer, and wherein the first microphone is mounted on the housing.

* * * * *